United States Patent
Anderson et al.

(12)

(10) Patent No.: US 6,932,514 B2
(45) Date of Patent: Aug. 23, 2005

(54) HIGH DENSITY MODULAR BACKPLANE CONNECTOR FOR FIBER OPTICS

(75) Inventors: Jerry M. Anderson, Austell, GA (US); Scott R. Andrews, Dacula, GA (US); Sean L. Jones, Clarkson, GA (US); Norman R. Lampert, Norcross, GA (US); Gregory A. Sandels, Buford, GA (US)

(73) Assignee: Furukawa Electric North America, Inc., Atlanta, GA (US)

( * ) Notice: Subject to any disclaimer, the term of this patent is extended or adjusted under 35 U.S.C. 154(b) by 268 days.

(21) Appl. No.: 10/349,389

(22) Filed: Jan. 21, 2003

(65) Prior Publication Data

US 2004/0141692 A1 Jul. 22, 2004

(51) Int. Cl.[7] .................................................. G02B 6/38
(52) U.S. Cl. .............................. 385/59; 385/56; 385/58; 385/60
(58) Field of Search ..................... 385/55–60, 135–137, 385/139

(56) References Cited

U.S. PATENT DOCUMENTS

| | | |
|---|---|---|
| 5,274,729 A | 12/1993 | King et al. |
| 6,364,534 B1 | 4/2002 | Lampert |
| 6,402,393 B1 | 6/2002 | Grimes et al. |
| 6,406,192 B1 * | 6/2002 | Chen et al. .................... 385/56 |

\* cited by examiner

Primary Examiner—Brian Healy
Assistant Examiner—Derek L. Dupuis
(74) Attorney, Agent, or Firm—Thomas, Kayden, Horstemeyer & Risley, LLP

(57) ABSTRACT

A high density panel mounting assembly has a first connector housing having first and second arrays of channels for receiving modified connectors, separated by a shelf. An adapter assembly for receiving the ferrules of the connectors has an interior wall having first and second arrays of bored projections forming sleeves for receiving the connector ferrules. The adapter assembly has a second connector housing substantially identical with the first connector housing mounted to or integral with the rear of the adapter housing for receiving individual connectors. Each of the connector housings has an array of apertures along the top and bottom surfaces for latching the connectors in place. Each of the connectors has a resilient latching arm having a distal end having a latching surface thereon which bears against the end of its corresponding aperture to latch the connector in place within the connector housing. The first and second connector housings each receives the connectors in an aperture, the width of which is substantially equal to the sum of the widths o the connectors so that the connectors, when in place, bear against each other to prevent lateral displacement thereof.

15 Claims, 4 Drawing Sheets

HIGH DENSITY MODULAR BACKPLANE CONNECTOR FOR FIBER OPTICS

FIELD OF THE INVENTION

This invention relates to a high density panel mounting assembly for interconnecting optical circuit boards with optical connectors arrayed on a mounting panel or backplane.

BACKGROUND OF THE INVENTION

For a variety of reasons, modem communication equipment is now being designed to process data at progressively higher speeds. Perhaps the most significant reason relates to the need to transfer video information between computers. Such data transfer has grown exponentially in recent years, and no decrease in growth is anticipated in the foreseeable future. In order to handle this growth, only optical circuitry appears capable of meeting the demand because of the enormous bandwidth that an optical fiber can provide. Nevertheless, distribution equipment is still needed to route optical signals to the same pre-existing locations, and this means that optical connecting hardware needs to be sufficiently small to accommodate large numbers of individual fiber connections. Thus, while high speed and large bandwidth are achievable, the amount of space, or "real estate" available for making necessary connections of the fiber is limited, thereby limiting the distribution potential of the system.

One particular location where congestion occurs is on circuit boards that contain optical components (i.e., optical circuit boards or PCBs) where individual input/output ports must be provided to make connections on a per-fiber basis. Moreover, it is desirable to plug these circuit boards into a panel, or backplane, that accommodates a number of other circuit boards similar to the way electrical circuit boards are mounted in an equipment bay each in its designated slot. However, electrical connections can be easily configured to accommodate the available space, while the primary vehicle for optical connection is the "butt" connector where the end face of one fiber is butted against the end face of another fiber. In such a connection, there should be no air gap between the fiber end faces and there should be no fiber displacement in the X and Y directions—otherwise there would be too much signal loss. (It is noted that a singlemode optical fiber has a light-carrying region that is only about 8 microns ($\mu$m) in diameter, and that it must be precisely aligned in an axial direction with another fiber.) It is therefore a challenging task to provide a number of optical devices on a plug-in optical circuit board that accurately mate with a corresponding number of stationary optical connectors.

Optical devices are known that might be adapted to mount on an optical circuit board, but their construction is relatively complex and/or their attachment to an optical circuit board requires expensive and time-consuming manual labor. More importantly, there is a need to standardize the optical interface for plug-in optical circuit boards. The interface should provide accurate optical alignment and be suitable for high density interconnection.

Inasmuch as the fiber density in a backplane has increased dramatically with the development of all optical networking in transmission systems, prior art backplane connectors pose a limitation on the number of fiber paths per printed circuit board and slot arrangements in a shelf or cabinet. In many instances, previous transmission systems have generally employed two fiber optic paths per card (circuit board). Efforts to increase the number of paths have led to arrangements having eight fiber paths per card/slot, but it is expected that future systems may have as many as thirty-four or even more fiber paths. The complexity of PCB (printed circuit board) card increases in direct proportion to the number of additional fiber paths, which severely limits the available real estate for accommodating the individual fiber optic connector components. In U.S. Pat. No. 6,402,393B1 of Grimes, et al., there is shown a system wherein several duplex connectors are arrayed along a side edge of a circuit board and are positioned to mate with corresponding receptacles or adapters mounted on the backplane. Inasmuch as positioning of each connector and its corresponding adapter must be precise for optimum signal transfer, such an arrangement necessarily occupies a large amount of available real estate on the card or circuit board while limiting the number of optical paths that can be accommodated.

Plug-in circuit boards that house optical components will soon be as familiar as circuit boards that house electrical components. The plug-in concept has been widely accepted because such circuit boards provide a large and manageable amount of hardware on an easily replaceable device. Circuit boards frequently include diagnostic hardware and software that can alert service personnel when a board is not working properly. And because a defective board can be quickly replaced by pulling out one circuitry board and plugging in another, maintenance is facilitated and downtime is minimal. This is particularly useful in large and complex systems where removal of a single board affects a large number of customers. The convenience of plug-in circuit boards is largely attributable to the fact that all connections between the board and a backplane can be non-destructively severed by merely pulling the circuit board from the slot where it operatively resides. By "backplane" is meant, generally, a wall that separates internal apparatus from external apparatus, and through which a connection(s) is made. It necessarily follows, therefore, that connections of a multiplicity of signal paths must be anticipated and the necessary hardware developed, which does not require exorbitant real estate on the PCB, for example.

SUMMARY OF THE INVENTION

The present invention is a modular backplane connector configuration especially for use with an LC type connector, although it is to be understood that the principles involved are equally adaptable for use with other types of connectors.

In an embodiment of these principles, a connector housing, generally rectangular in shape and preferably of suitable plastic material, for mounting on the leading edge of the insertable card, has a laterally extending shelf member bridging an enlarged rectangular frame opening and thereby forming upper and lower openings which are, preferably, mirror or inverted images of each other. The top inner surface of the upper opening has a plurality of channels arranged in an array extending across the width of the opening, each channel being configured to accommodate the latching arm of an LC connector. In the embodiment herein, there are eight such channels, formed by depending ribs extending through the housing from front to back. In a like manner, the bottom inner surface of the lower opening, which is a mirror image of the top inner surface of the upper opening, has eight channels formed therein. The top wall of the housing has an array of individual latching apertures, each aperture opening into a channel and the bottom wall of the housing has such an array. Thus, the bottom wall of the housing has an individual latching aperture communicating with each channel in the bottom wall.

The standard LC connector includes a resilient latching arm having latching lugs on either side thereof for latching the connector to a standard adapter. In accordance with the present invention, the latching arm is shortened and has a lateral latching face on its distal end termination, and the latching lugs are removed. Thus, when the connector is inserted into the housing opening so that the latching arm rides in a channel, the connector rests upon the shelf and the latching ann, being resilient, intrudes into the latching aperture, thereby latching the connector in the housing. In the embodiment discussed herein, the eight connectors may be inserted into the upper opening and eight in the lower and latched in place, with the sides of each of the connectors contacting the sides of adjacent connectors. Thus, there are no walls, ribs, or septa separating connectors from each other, and the connectors themselves provide alignment for adjacent connectors. Only each of the individual latching arms, which is not as wide as the connector body, is separated from adjacent latching arms, while the channels perform an alignment function for an individual connector. The lower opening, being a mirror or inverted image of the upper opening also accommodates eight connectors in the same manner. As a consequence, the width of the connector housing is materially less than that of prior art devices. The width of the top and bottom frame openings is substantially equal to the sum of the widths of the maximum number of connectors that can be inserted, hence when all of the connector plugs are in place, they are restrained from any lateral movements or slippage. Alternatively, the width of the opening is equal to the plug width times the number of channels.

The adapter or receptacle for the connector is mounted on the backplane, and comprises a substantially rectangular housing having a rectangular opening into which the previously discussed connector housing fits. The opening has a vertical wall extending laterally within the opening from which extend two horizontal arrays of bored cylindrical bosses or protrusions which are adapted to receive and align the ferrules of the connectors when the connector housing is inserted into the receptacle. Similarly, the rear wall (the subscriber side of the backplane) has two horizontal arrays of cylindrical bosses for receiving the ferrules of the LC connectors which distribute the individual communication channels to their proper destination. These connectors are mounted in a housing that is substantially identical to the previously described connector housing for the card or panel side. This connector housing is preferably integral with the adapter housing although it may be a separate component if desired.

A rectangular apertured mounting bracket receives the adapter housing which is latched thereto and which, in turn, is mountable on the backplane plate or panel.

The embodiment of the invention as described in the foregoing has a footprint that is substantially less or smaller than that of prior art eight (or sixteen) connector arrangements, and consequently, does not require as much space or real estate on the PCB or on the backplane panel. As a consequence, a much higher density of connections is available in less space. The unique construction, e.g., elimination of individual walls or septa for separating connectors, and the miniaturized latching arrangement for the connectors, makes possible greatly increased numbers of connections in less space than in normally required in the prior art, and extends the limits on the number of connections that can be made without alteration of the PCB or backplane panel.

These and other principles and features of the present invention will be more readily apparent from the following detailed description, read in conjunction with the accompanying drawings.

DETAILED DESCRIPTION

Figure 1:
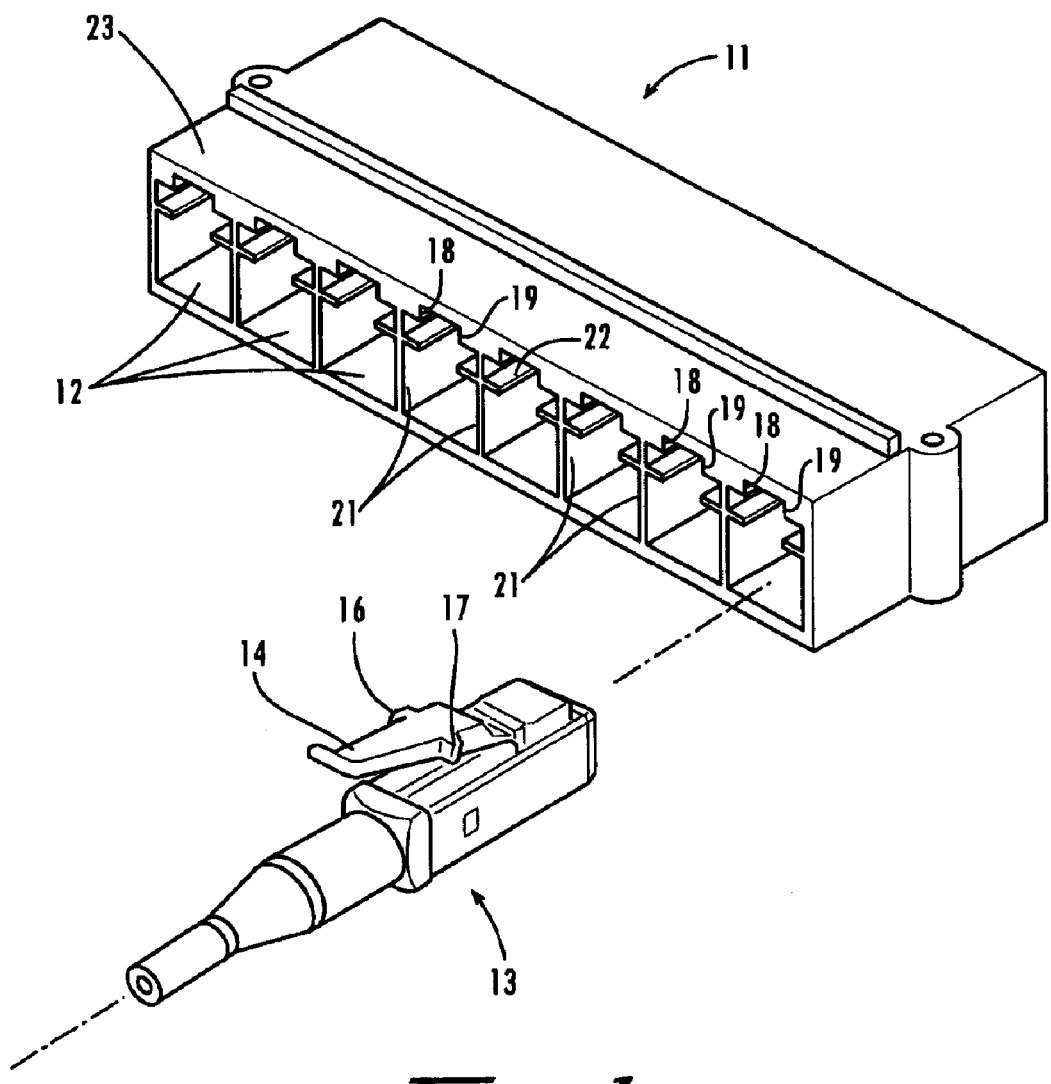
FIG. 1 is a perspective view of a prior art adapter and connector arrangement.

FIG. 1 illustrates an eight apertured adapter 11, which generally is mounted on the backplane panel, not shown, as is illustrated in U.S. Pat. No. 6,402,393B1 of Grimes, et al., the disclosure of which is incorporated herein by reference, but which may, instead, be mounted on the PCB (not shown), provided the backplane has mounted thereon a mating structure. Each of the eight apertures 12 is adapted to receive a standard LC connector 13 which has a resilient cantilevered latching arm 14, equipped with first and second latching lugs 16 and 17 which are adapted to latch to latching ridges 18 and 19 extending from the walls 21 of each of the apertures 12 when the connector 13 is inserted therein. In the case where adapter 11 is mounted on the backplane, the connectors 13 are mounted on the PCB in a manner such as is shown in the Grimes et al patent, spaced to match the spacing of the apertures 12 in adapter 11. As can be seen in FIG. 1, each of the apertures 12 has a channel 22 therein formed by ridges 18 and 19 and the inner surface of top surface 23 of adapter 11 to accommodate the latching arm 14 of each connector 13. Although other elements of the connection formed by connectors 13 and its mounting are not shown, it can be seen that the footprint of the adapter 11, and hence, the corresponding holder for the connector 13 is so large as to limit the number of connections that can be made, without excessive intrusion on the available real estate of the PCB and of the backplane. Inasmuch as adapter member 11 requires walls 21 to define the individual apertures 12 and to support the latching ridges 18 and 19, thereby contributing to the width, limits are placed on the minimum footprint of the apparatus in order that proper seating and latching of the connector 13 can be made.

Figure 2:
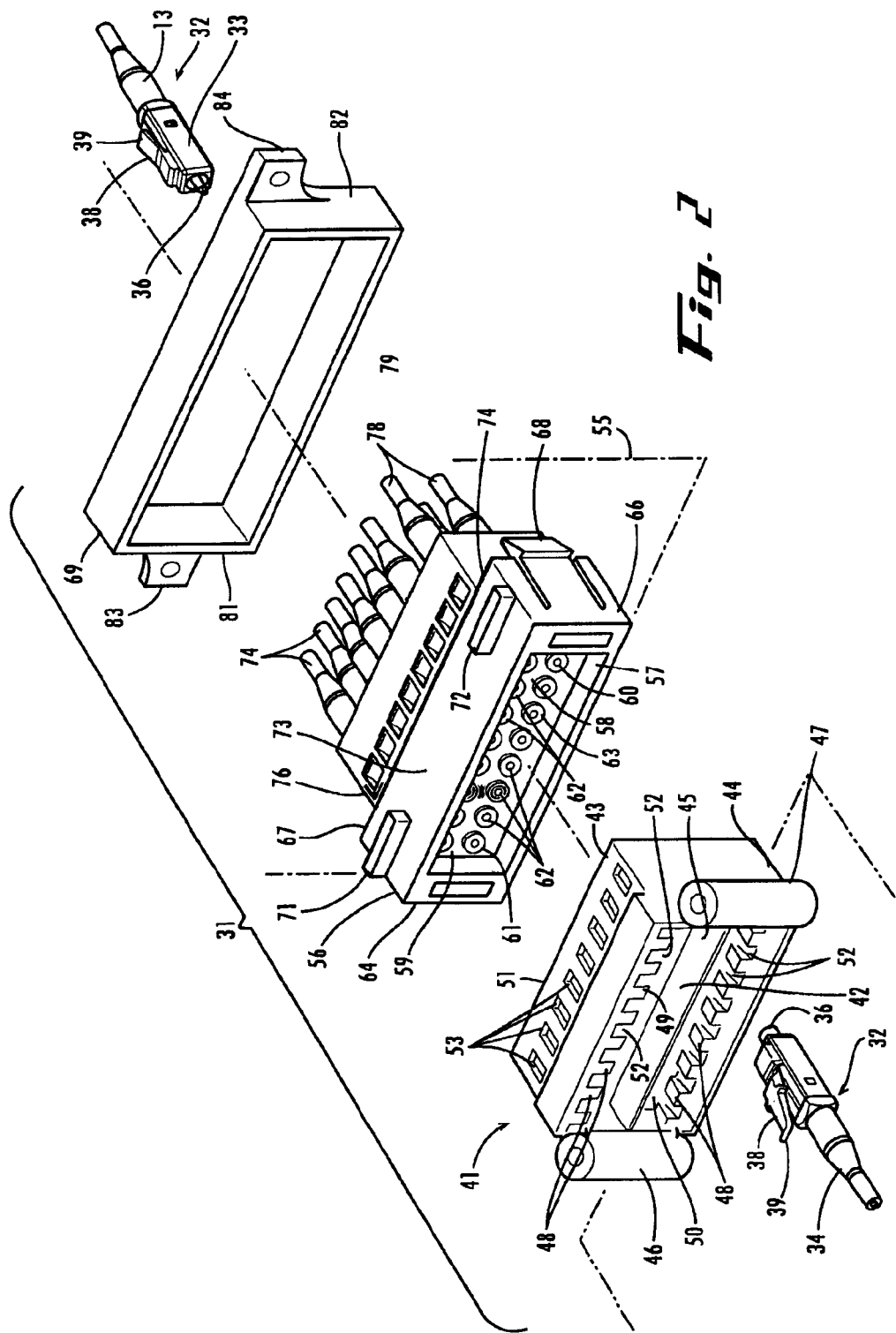
FIG. 2 is an exploded perspective view of the connector assembly of the present invention.
Figure 3A:
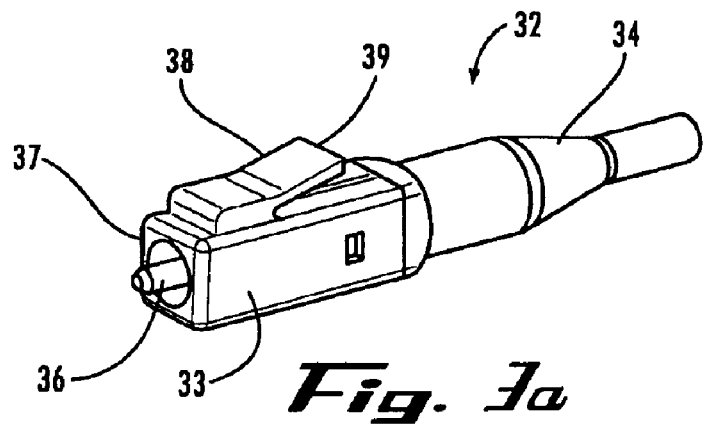
FIGS. 3a and 3b are perspective and elevation views, respectively, of the modified connector plug of the invention.
Figure 3B:
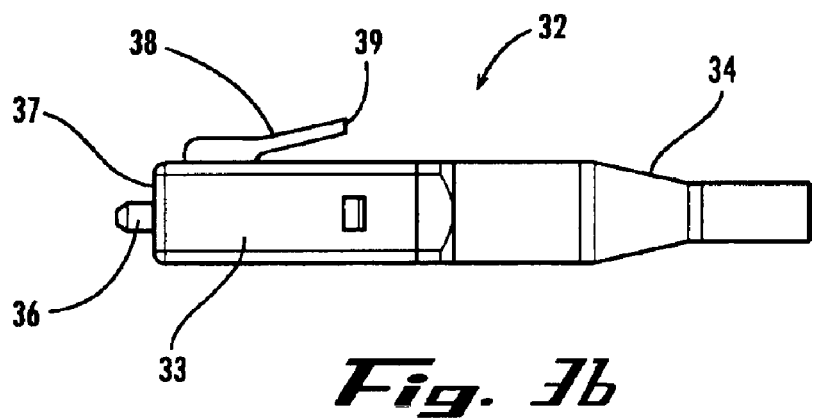

FIG. 2 is an exploded perspective view of the high density connector assembly 31 of the invention, which, as will be apparent hereinafter, has a materially smaller footprint than the prior art devices, as well as a smaller vertical dimension which allows stacking of two arrays of connectors in only slightly more space than the single array adapter of, for example, FIG. 1. In the ensuing discussion, the principles of the invention are illustrated in a sixteen apertured connector assembly 31, but it is to be understood that more or fewer apertures may be used depending on the system requirements. In order to achieve the desired results it has been necessary to modify the LC connector plugs, two of which, 32, are shown, for use in the assembly 31. Connector plug 32 is, for purposes of illustrating the principles of the invention, a modified LC type connector as shown in FIGS. 3(a) and 3(b). Connector 32 comprises a body 33 and a boot portion 34, with a fiber containing ferrule 36 extending from the front or connector end 37. These are standard elements of a standard LC type connector, such as is shown in the aforementioned Grimes, et al. patent, in particular, FIG. 7 thereof. However, the resilient latching arm 38 which is not as wide as the connector body is shorter than that of a standard LC connector, and the distal end thereof terminates in a straight, laterally extending latching face or surface 39. In addition, the resilient arm has no latching lugs (16 and 17 in FIG. 1) extending therefrom.

Connector Housing

An apertured connector housing 41 for mounting on the leading end of a PCB 40, shown in dashed lines, comprises a hollow rectangular body having a shelf 42 extending transversely from side to side across the opening of housing 41 approximately midway between the top 43 and bottom 44 thereof, thereby forming upper and lower openings 45 and 50. At either end of the housing 41 are bored mounting bosses 46 and 47 for mounting the housing to the PCB as by bolts or the like. On the under side surface of the top 43 are arrayed a plurality of spaced ribs or splines 48, parallel to each other and extending from the front 49 to the back 51 of the top 43 and opening 45. The spacing of the ribs 48 is such that they form an array of parallel channels 52, each adapted to receive the latching arm 38 of a connector 32. Thus, when a connector 32 is inserted into the top half 45 of the housing aperture, it is guided into position by the joint action of the channel 52 and the latching arm 38, and rests upon the shelf 42. As will be seen in subsequent figures, when eight connectors are inserted, their sides abut, there being no walls separating them. Thus, when any two connectors are in place and are separated by a gap, they function, along with the channel in the gap, to guide the missing connector into place and, when all of the connectors 32 are in place, they occupy the top opening from side to side, thereby preventing lateral movements.

Across the top 43 is an array of spaced rectangular apertures 53, each one of which communicates with a channel 52. When a connector is inserted into a channel far enough that the latching arm is directly below its gap, the arm, being resilient, and having been pressed down during insertion, springs upward into the gap, thereby latching the connector in position due to the latching surface 39 on arm 38 bearing against the end of its aperture. The bottom half 50 of the housing aperture is a mirror image of the top half 45, and includes ribs 48 and channels 52 which are, as shown, arrayed along the bottom surface of opening 50. Likewise, the bottom surface 44 of housing 41 has an array of apertures 53 (not shown), each of which communicates with a channel 52 in the same manner as explained in the foregoing.

Adapter Housing

In order that the leads from the PCB 40 may be connected to individual leads at the backplane 55, as depicted by dashed lines, an adapter housing 56 is mounted on the backplane panel 55 for receiving the connector housing 41 and the ferrules 36 of the connectors 32 when the PCB 40 is inserted into its designated slot of the backplane assembly. Housing 56 has an aperture 57 on the conventionally designated cabinet side dimensioned to receive the connector housing 41. A recessed wall 58 extends across the aperture 57 and has extending therefrom two rows or arrays 59 (upper) and 61 (lower) of cylindrical bosses or projections 62 which have longitudinal bores 63 forming sleeves for receiving the ferrules 36 of connectors 32. In a like manner, the other side of wall 58 has two arrays of bored projections 62 aligned with the projections 62 on the first side of wall 58. In actuality, and as will be seen in subsequent figures, the bored projections 62 extend through the wall 58. The two end walls 64 and 66 of adapter housing 56 have first and second resilient latches 67 and 68 formed thereon for latching the adapter housing 56 to a mounting bracket 69 as will be discussed hereinafter. First and second stop ridges 71 and 72 project from the top surface 73 of adapter housing 56 which function to locate and hold mounting bracket 69 in place, as will be apparent hereinafter.

Adapter housing 56 has, extending from the rear 74 thereof on the conventionally designated subscriber side, a connector housing 76 which is substantially identical to connector housing 41, previously described, having upper 77 and lower 78 arrays of channels (not shown) for receiving an upper array of connectors 32 and a lower array of identical connectors 32, whose ferrules align with the ferrules of the connectors 32 on the PCB side of connector assembly 31 through the sleeves 63 formed by the bored bosses or projections 62. Housing 76 also, in the same manner as connector housing 41, has an array of apertures 53 for latching the rear (or subscriber) connectors 32 in place in housing 76 in the same manner as explained hereinbefore.

Mounting bracket 69 has an aperture 79 extending therethrough which is dimensioned and shaped to receive adapter housing 56 which is inserted therein until bracket 69 butts against stop members 71 and 72. From each end wall 81 and 82 of bracket 69 extends a mounting ear 83 and 84, each of which is bored to receive a bolt or other mounting member for affixing the bracket 69, and hence the adapter housing 56, latched to bracket 69 by means of latches 67 and 68 to the back plane panel 55.

Figure 4:
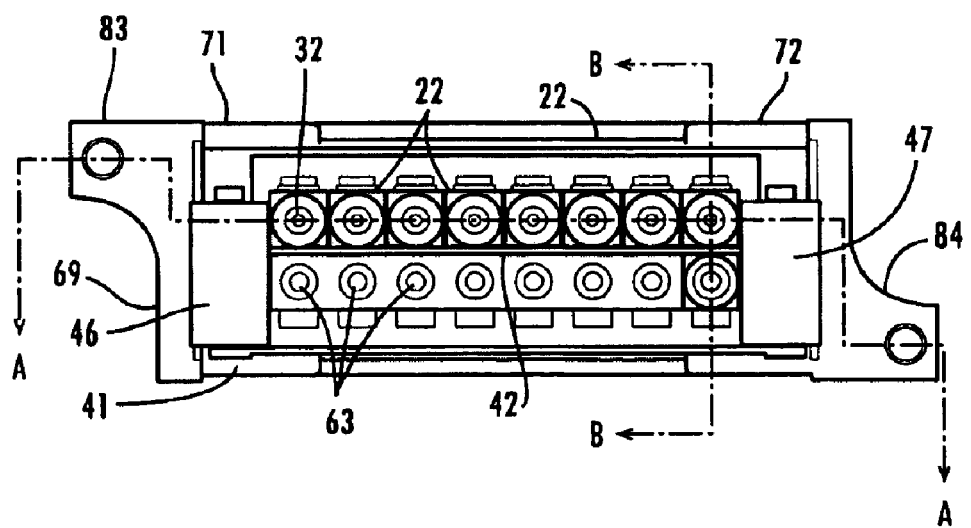
FIG. 4 is an elevation view of the assembled connector assembly of FIG. 2.

FIG. 4 is an end elevation view of the connector assembly 31 of the present invention, having eight connectors 32 in the top array of channels 22 and one connector 32 in the bottom array of the connector housing 41. It can be seen that each connector 32 in the top row is fitted into its own discrete channel 22 while the sides of the connectors 32 bear against each other. Thus, the channels 22 serve to guide the connectors into place, while the connectors themselves hold the connectors from shifting laterally.

Figure 5:
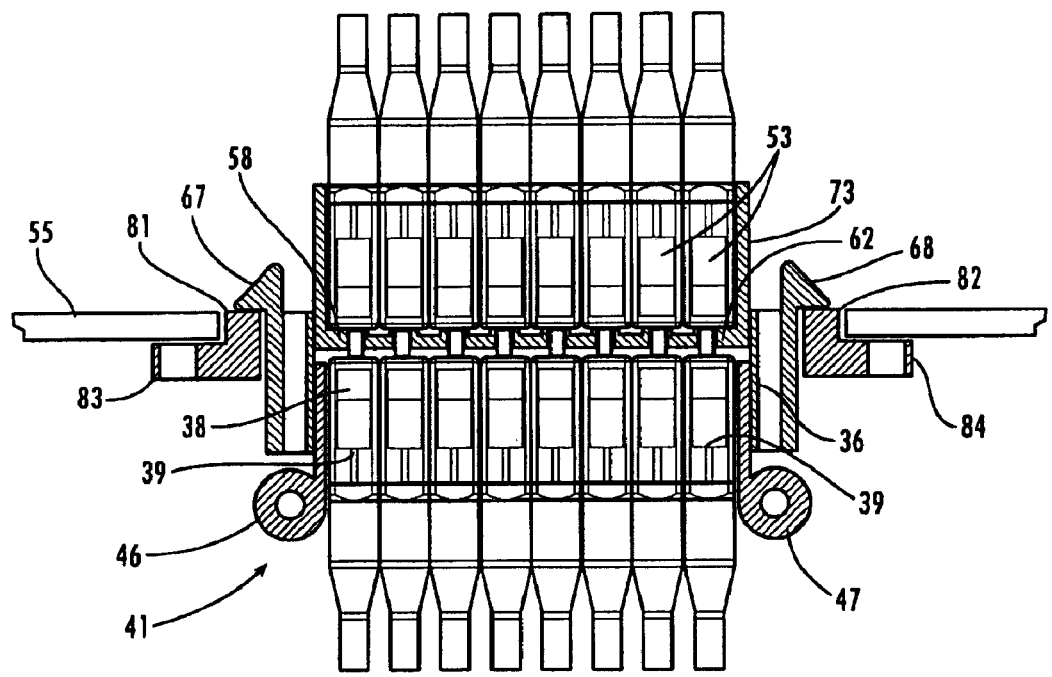
FIG. 5 is a plan view in parted cross-section along the line A—A of FIG. 4.

FIG. 5 is a top plan view in cross-section along the line A—A in FIG. 4. It can be seen that the width of the upper opening 45 of the connector housing 41 is equal to the width of the array of connectors 32 inserted therein so that the sides of the connectors 32, where installed, bear against each other and prevent lateral movement of the connectors in the array. The same is true of the lower opening 50 and of the upper and lower openings (not shown) of the connector housing 76 mounted to the adapter housing 56 either integrally or as a separate part.

Figure 6:
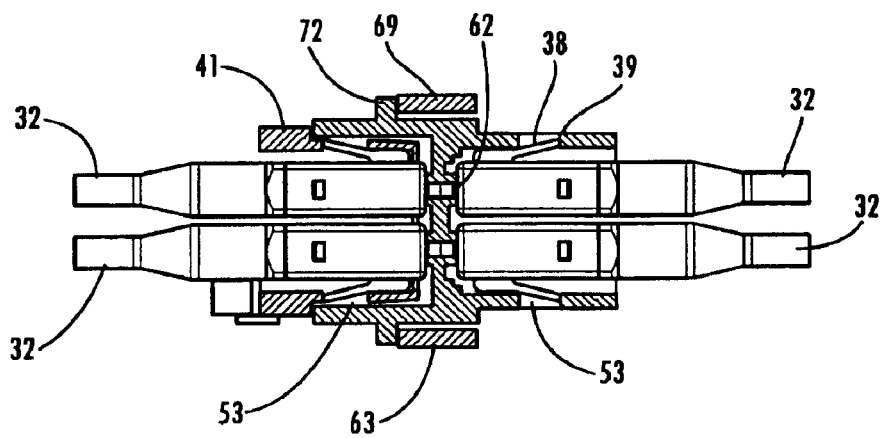
FIG. 6 is a side elevation view in partial cross-section along the line B—B of FIG. 4.

FIG. 6 is a cross-section along the line B—B of FIG. 4 and shows the action of the latching face or surface 39 with the end of the rectangular aperture 53. When the connector is inserted into either of the connector housings 41 or 76, the resilient latching arm 38 thereof is cammed downwardly until the arm 38 is located beneath the aperture 53 where it is free to spring upward into the aperture as shown in FIG. 6 so that the latching surface 39 prevents removal of the connector 32 by bearing against the end face of the aperture 53. Such a latching arrangement does not require the latching lugs 16 and 17 (see FIG. 1) and the latching ridges 19, with consequent saving in space, nor is it necessary to have dividing walls or septa 21, also shown in FIG. 1. As a consequence, the width or footprint of the connector assembly, i.e. connector housing 41 on the PCB 40 and the adapter housing 56 on the backplane, is materially less than that of prior art assemblies, as exemplified in FIG. 1. Also, the two arrays of connectors as shown in connector housing 41, for example, are only slightly greater in height than the adapter 11 shown in FIG. 1, which permits stacking of connector arrays without a significant increase in height while greatly increasing the member of connectors that can be accommodated.

The connector assembly of the invention therefore comprises less real estate for any given member of connectors, and makes feasible a material increase in the number of connectors that can be accommodated within the reduced area occupied by the connector assembly.

It is to be understood that the various features of the present invention might readily be incorporated into other types of connector assemblies, and that other modifications or adaptations might occur to workers in the art. All such variations and modifications are intended to be included herein as being within the scope of the present invention as set forth in the claims hereinafter. Further, in the claims hereinafter, the corresponding structures, materials, acts, and equivalents of all means or step-plus-function elements are intended to include any structure, material, or acts for performing the functions in combination with other elements as specifically claimed.

What is claimed is:

1. A connector assembly comprising a first connector housing for receiving connector plugs having ferrules therein and an adapter for receiving said first connector housing on a panel side and connector plugs for insertion in said first connector housing and for connection to plugs on a subscriber side;

said first connector housing comprising a first substantially rectangular member having an aperture extending therethrough from front to rear, said housing having top, bottom, and first and second side walls;

the inner surface of said top wall having a plurality of channels extending from the front of said housing to the rear thereof forming a first array of channels extending through said aperture;

a first plurality of latching apertures in said top wall, each of said latching apertures communicating through the top wall with one of said channels, wherein each of said channels is adapted to receive a latching arm of a connector plug; and wherein each of the connector plugs has a predetermined width greater than the width of the latching arm and of a corresponding channel, and the width of said aperture in said connector housing is substantially equal to the width of a connector plug times the number of said channels.

2. The connector assembly as claimed in claim 1 wherein each of the connector plugs has a resilient latching arm adapted to fit within one of said channels, said latching ann having a distal end terminating in an end surface comprising a latching face adapted to engage an end of a latching aperture.

3. A connector assembly as claimed in claim 1 wherein said adapter has a front, cabinet side and a rear, subscriber side and comprises a second substantially rectangular housing member having a rectangular aperture extending therethrough from front to rear, said second rectangular housing member having top, bottom, and first and second side walls;

said rectangular aperture of said adapter being dimensioned to receive said first connector housing therein on the cabinet side of said adapter.

4. A connector assembly as claimed in claim 3 wherein said second rectangular housing member has a recessed vertical wall extending across said rectangular aperture of said adapter from said first to said second side wall.

5. A connector assembly as claimed in claim 4 wherein said vertical wall has a first array of bored projections extending therefrom forming ferrule receiving sleeves, each of said sleeves being aligned with a ferrule of a connector plug when the plug is inserted in one of said channels in said connector housing.

6. A connector assembly as claimed in claim 3 and further including resilient latching members on each of said first and second side walls.

7. A connector assembly as claimed in claim 6 and further including a mounting bracket having an opening therein for receiving said adapter housing and adapted to be latched thereto by said resilient latching members, said bracket having means thereon for affixing it to a back plane panel.

8. A connector assembly as claimed in claim 3 and further including first and second stop ridges on the upper surface of said top wall.

9. A connector assembly as claimed in claim 8 and further including a mounting bracket having an opening therein for receiving said adapter housing and adapted to be fixed in position with respect thereto by said stop ridges.

10. A connector assembly comprising a first connector housing for receiving connector plugs having ferrules therein and an adapter for receiving said first connector housing on a panel side, and connector plugs for insertion in said first connector housing and for connection to plugs on a subscriber side;

said first connector housing comprising a substantially rectangular member having an aperture extending therethrough from front to rear, said housing having top, bottom, and first and second side walls;

the inner surface of said top wall having a plurality of channels extending from the front of said housing to the rear thereof forming a first array of channels extending through said aperture;

a first plurality of latching apertures in said top wall, each of said latching apertures communicating through the top wall with one of said channels, wherein each of said channels is adapted to receive a latching arm of a connector plug; and a shelf member extends across said aperture dividing it into an upper opening and a substantially identical lower opening;

said lower opening being an inverted image of said upper opening, wherein the inner surface of said bottom wall has a second plurality of channels extending through said lower opening thereby forming a second array of channels extending from the front of said housing to the rear thereof.

11. The connector assembly as claimed in claim 10 wherein said lower wall has a second plurality of latching apertures therein, each of said latching apertures communicating through the bottom wall with one of said second plurality of channels.

12. A connector assembly as claimed in claim 10 wherein the width of said lower opening is substantially equal to the width of a connector plug times the number of said second plurality of channels.

13. A connector assembly comprising a first connector housing for receiving connector plugs having ferrules therein and an adapter for receiving said first connector housing on a panel side and connector plugs for insertion in said first connector housing and for connection to plugs on a subscriber side;

said first connector housing comprising a substantially rectangular member having an aperture extending therethrough from front to rear, said housing having top, bottom, and first and second side walls;

the inner surface of said top wall having a plurality of channels extending from the front of said housing to the rear thereof forming a first array of channels extending through said aperture;

a first plurality of latching apertures in said top wall, each of said latching apertures communicating through the top wall with one of said channels, wherein each of said channels is adapted to receive a latching arm of a connector plug; and said adapter has a front, cabinet side and a rear, subscriber side and comprises a second substantially rectangular housing member having a rectangular aperture extending therethrough from front to rear, said second rectangular housing member having top, bottom, and first and second side walls;

said rectangular aperture of said adapter being dimensioned to receive said first connector housing therein on the cabinet side of said adapter;

said second rectangular housing member having a recessed vertical wall extending across said rectangular aperture of said adapter from said first to said second side wall;

wherein said vertical wall has a first array of bored projections extending therefrom forming ferrule receiving sleeves, each of said sleeves being aligned with a ferrule of a connector plug when the plug is inserted in one of said channels in said connector housing; and said vertical wall has a second array of bored projections extending therefrom forming ferrule receiving sleeves, said second array being vertically spaced from said first array to form upper and lower arrays;

each of the sleeves of said first array being aligned with a ferrule of a connector plug when the plug is inserted in one of said channels of said upper array and each of the sleeves of the second array being aligned with a ferrule of a connector plug when the plug is inserted in one of said channels in said lower array.

14. A connector assembly comprising a first connector housing for receiving connector plugs having ferrules therein and an adapter for receiving said first connector housing on a panel side and connector plugs for insertion in said first connector housing and for connection to plugs on a subscriber side;

said first connector housing comprising a substantially rectangular member having an aperture extending therethrough from front to rear, said housing having top, bottom, and first and second side walls;

the inner surface of said top wall having a plurality of channels extending from the front of said housing to the rear thereof forming a first array of channels extending through said aperture;

a first plurality of latching apertures in said top wall, each of said latching apertures communicating through the top wall with one of said channels, wherein each of said channels is adapted to receive a latching ann of a connector plug;

said adapter having a front, cabinet side, and a rear, subscriber side and comprising a second substantially rectangular housing member having a rectangular aperture extending therethrough from front to rear, said second rectangular housing member having top, bottom, and first and second side walls;

said rectangular aperture of said adapter being dimensioned to receive said first connector housing therein on the cabinet side of said adapter;

said second rectangular housing member having a recessed vertical wall extending across said rectangular aperture of said adapter from said first to said second side wall;

wherein said vertical wall has a first array of bored projections extending therefrom forming ferrule receiving sleeves, each of said sleeves being aligned with a ferrule of a connector plug when the plug is inserted in one of said channels in said connector housing; and a second connector housing member having a configuration essentially identical to the first connector housing member and including at least one array of channels and an array of latching apertures in the top thereof communicating with said channels.

15. For use in a high density connector assembly for optical fibers, a connector housing comprising:

a substantially rectangular member having an aperture extending therethrough from front to rear, said housing having top, bottom, and first and second side walls;

a plurality of members forming an array of channels extending across the top of said aperture;

a plurality of latching apertures in the top wall of said housing, each of said apertures communicating through the top wall with one of said channels, wherein each of said latching apertures in said channels is adapted to receive the terminal end of a latching arm of a connector plugs, each of the connector plugs having a predetermined width; and the width of said aperture in said housing is substantially equal to the width of a connector plug times the number of said channels.

* * * * *